United States Patent [19]
Dunbeker

[11] 4,092,392
[45] May 30, 1978

[54] METHOD FOR MAKING A PLASTIC CONTAINER HAVING A PORT ADJACENT THE CONTAINER PERIPHERY

[75] Inventor: George H. Dunbeker, Hightstown, N.J.

[73] Assignee: Rheem Manufacturing Company, New York, N.Y.

[21] Appl. No.: 725,004

[22] Filed: Sep. 20, 1976

[51] Int. Cl.² .............................................. B29C 17/07
[52] U.S. Cl. ...................................... 264/98; 425/525; 425/529
[58] Field of Search ...................... 264/94, 98, 99, 296; 425/DIG. 204, DIG. 214, DIG. 216, 525, 528, 529

[56] References Cited

U.S. PATENT DOCUMENTS

| 3,100,317 | 8/1963 | Perry | 264/98 |
| 3,449,480 | 6/1969 | Hough | 264/98 |
| 3,452,391 | 7/1969 | Langecker | 264/94 X |
| 3,493,641 | 2/1970 | Svendsen | 264/98 |

FOREIGN PATENT DOCUMENTS

| 1,479,216 | 5/1969 | Germany | 264/98 |
| 1,043,263 | 9/1966 | United Kingdom | 425/DIG. 204 |

Primary Examiner—Jan H. Silbaugh
Attorney, Agent, or Firm—Watson, Leavenworth, Kelton & Taggart

[57] ABSTRACT

Method for making containers having enhanced emptying capability include a filling/emptying opening disposed closely adjacent the container sidewall and extending through integral top closure structure. The container sidewall has a portion contiguous with the filling/emptying opening which extends therefrom without radial step discontinuity, thus avoiding well formation adjacent the opening. A parison is stretched unidirectionally and transversely against restraint by a blow pin to avoid buildup of material in the sidewall portion contiguous with the filling/emptying opening and the stretched parison is blow molded to form the container.

3 Claims, 10 Drawing Figures

METHOD FOR MAKING A PLASTIC CONTAINER HAVING A PORT ADJACENT THE CONTAINER PERIPHERY

FIELD OF THE INVENTION

This invention relates generally to containers and more particularly to molded plastic containers.

BACKGROUND OF THE INVENTION

Various commercially known plastic containers are manufactured by extrusion blow molding techniques, such as are described in commonly-assigned U.S. Pat. No. 3,733,384. In such practices, a tube of plastic is extruded and disposed in a mold with one end of the tube closed by mating sections of the mold and the other tube end sealably encircling a blow pin serviced by a source of compressed air. In the course of the blowing cycle, the portion of the tube trapped by the mold sections is expanded to conform to the shape of the mold cavity. Upon separation of the mold sections and removal of the blow pin, the practice provides a container having a filling/emptying opening constituted by the passage occupied by the blow pin in the blowing cycle.

While containers so fabricated have seen extended commercial usage, they exhibit various shortcomings, notably, content retention after emptying efforts and handling inconvenience. In respect of content retention, some or many known containers retain contents by reason of interior well structure adjacent their filling-/emptying openings. As for handling inconvenience, some known containers, as shown, for example, in FIGS. 5–7 of U.S. Pat. No. 3,387,749, have integrally molded plastic handles aligned with the pour direction and are stackable only when compatibly orientated. In the 3,387,749 patent, a diametric rectangular trough indentation is formed in the base of the container adapted to receive the molded handle of another container for stacking thereon. Such arrangement excludes random stacking, requiring alignment of the handles and troughs of the containers before stacking. In another type of container, as shown, for example, in FIGS. 1 and 3 of the 3,387,749 patent, a handle in form of a wire bail is supported for pivotal movement into a use position and therefrom into a single recessed non-use position. While such latter containers may be randomly stacked, it is first required that their handles be disposed in such single non-use position.

SUMMARY OF THE INVENTION

It is an object of the present invention to provide improved molded plastic containers.

It is a more particular object of the invention to provide molded plastic containers exhibiting lessened content retention on emptying efforts, increased handling convenience and enhanced stackability.

In attaining the foregoing and other objects the invention provides, in its particularly preferred embodiment, a cylindrical container with integral top closure structure having a first land defining an uppermost container surface of generally flat discontinuous annular configuration and a second land below such first land defining a surface vertically recessed from such uppermost container surface. A filling/emptying opening is disposed adjacent the container sidewall situated in such vertically recessed surface in registry with the discontinuity in the annularly configured uppermost container surface. A handle is pivotally supported for movement into a use position vertically outwardly of the uppermost container surface and into either of plural non-use positions each recessing the handle with respect to the uppermost container surface. The container sidewall provides an interior surface portion contiguous with the filling/emptying opening and extending therefrom over a course without radial stepping, thereby eliminating well structure adjacent the access port in the pour direction.

The foregoing and other objects and features of the invention will be evident from the following detailed description of the preferred embodiment thereof and from the drawings wherein like reference numerals identify like parts throughout.

DESCRIPTION OF THE PREFERRED EMBODIMENT

Figure 2:
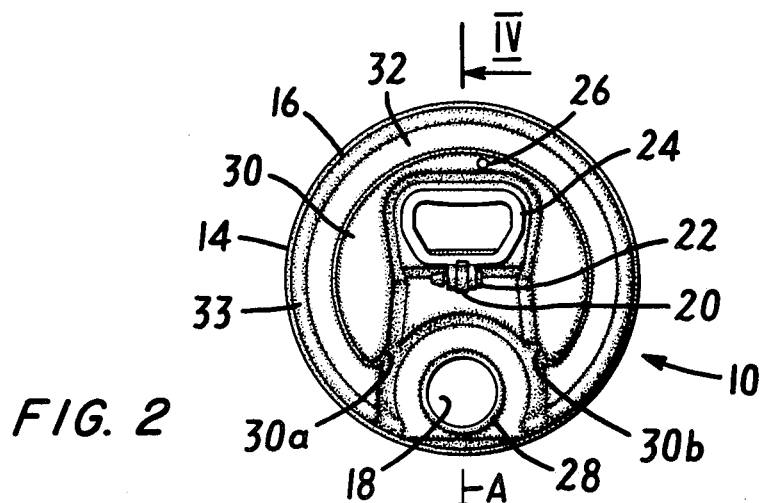
FIG. 2 is a plan elevation of the FIG. 1 container.
Figure 1:
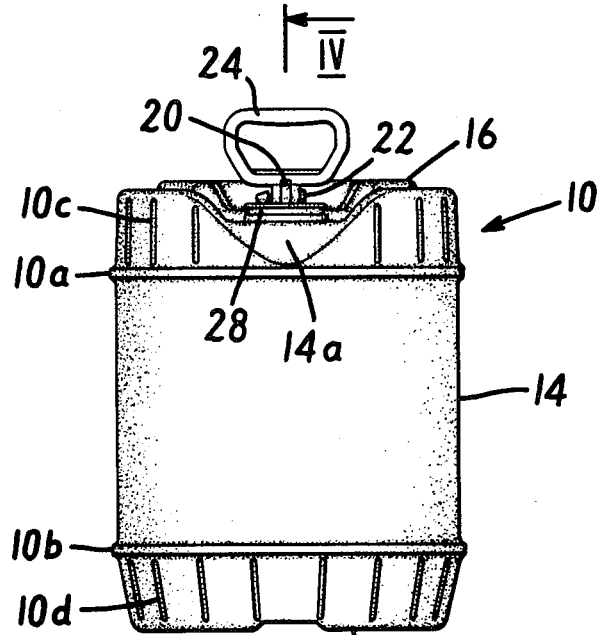
FIG. 1 is a front elevation of a container in accordance with the invention.

Referring to FIGS. 1 and 2, container 10 is of hollow cylindrical configuration, having a supporting base 12, a sidewall 14 extending upright from base 12 and a top closure 16, parts 12, 14 and 16 integrally structured as by the blow molding of an extruded plastic tube or parison as discussed below. The container may be horizontally beaded as at 10a, 10b and vertically ribbed as at 10c, 10d.

Top closure 16 has an access port 18 for filling/emptying, disposed closely adjacent sidewall 14, and also defines a hub 20 with pin 22 seated therein supporting handle 24 for pivotal movement in the direction of pour as indicated by arrow A in FIG. 2. The handle and pin are preferably comprised also of plastic material. Vent embossment 26 is provided in top closure 16.

Figure 3:
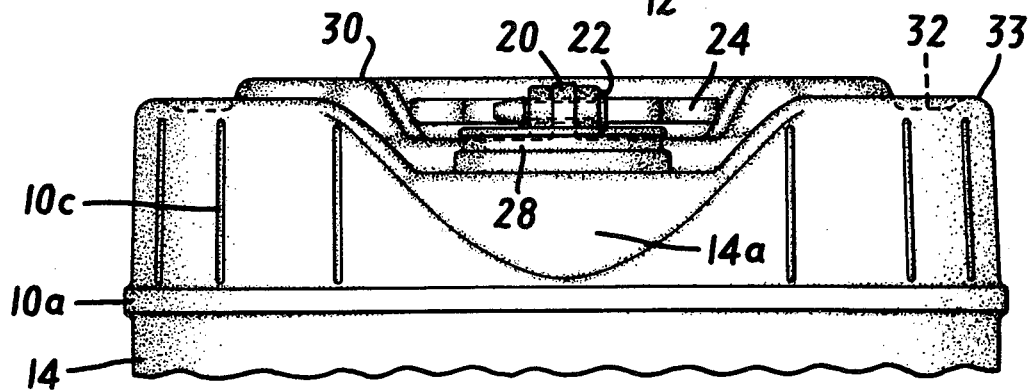
FIG. 3 is an enlarged partial front elevation of the FIG. 1 container.
Figure 4:
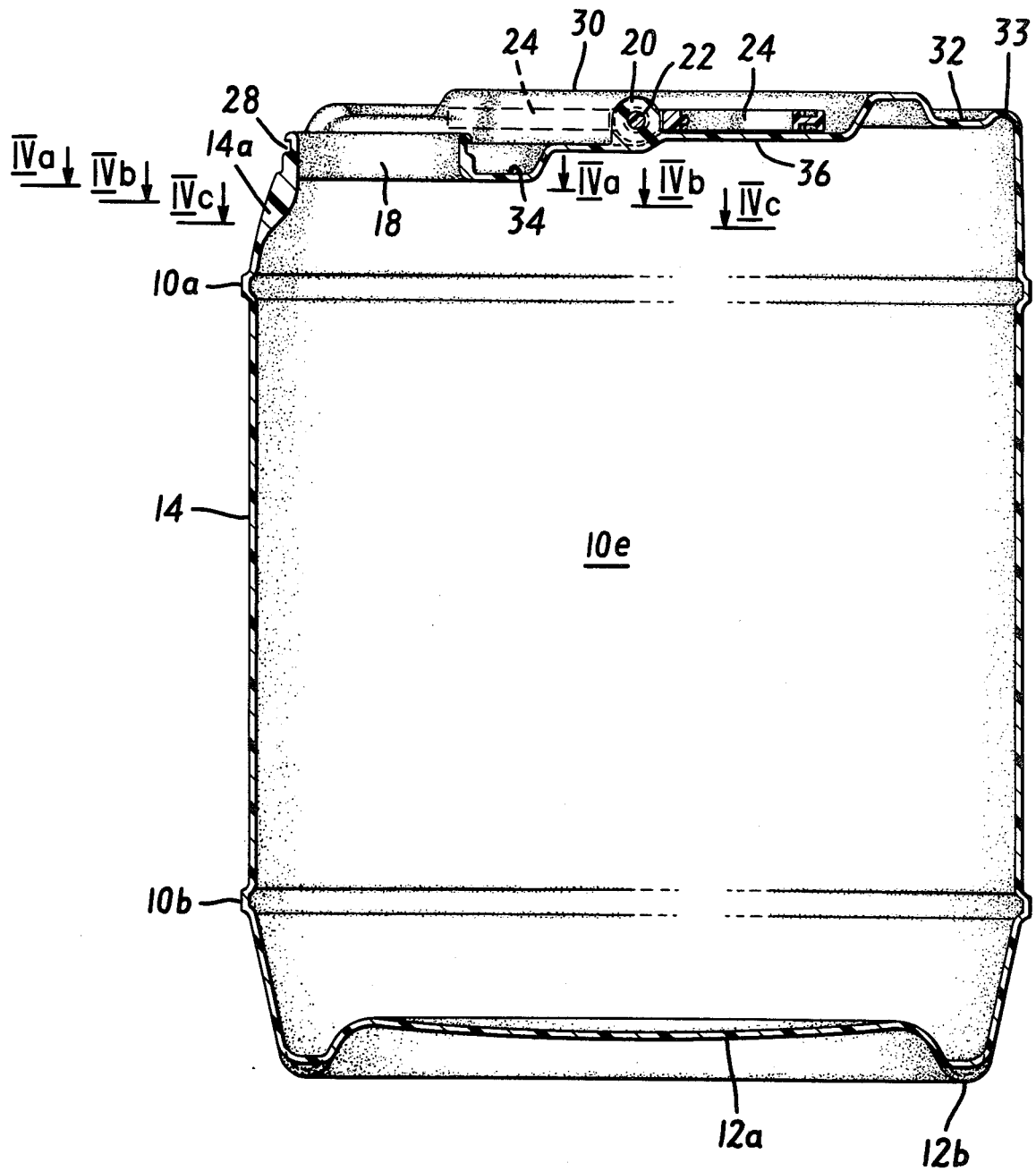
FIG. 4 is a sectional elevation as seen from plane IV—IV of FIG. 2.
Figure 4A:
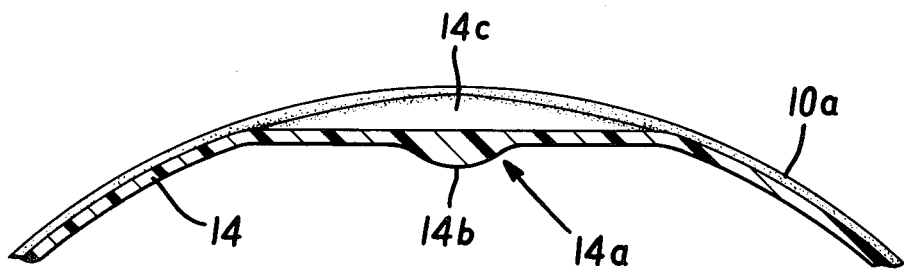
FIGS. 4a, 4b and 4c are partial sectional views as seen respectively downwardly from planes IVa, IVb and IVc of FIG. 4.
Figure 4B:
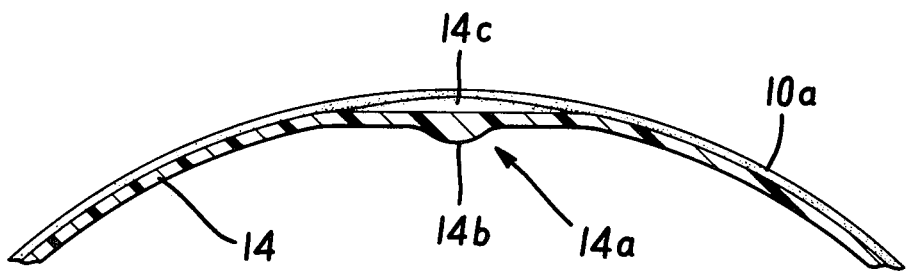
Figure 4C:
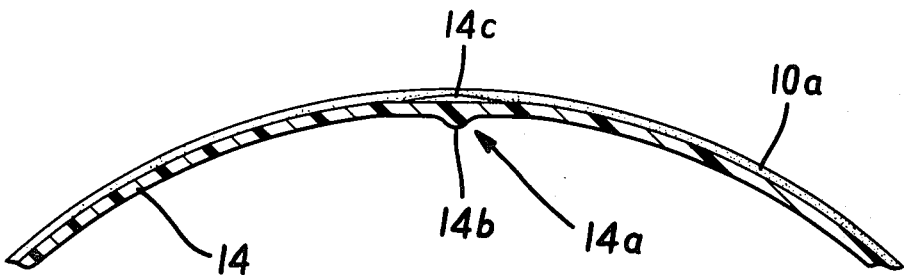

Referring now also to FIGS. 3 and 4, port 18 is provided with a neck 28 and sidewall 14 includes a portion 14a contiguous with neck 28. Such portion 14a has a surface 14b in facing relation to container interior 10e with a continuously arcuate course extending axially downwardly and radially outwardly from neck 28 to the expanse of sidewall 14 adjacent such portion 14a, i.e., surface 14b is contiguous with neck 28 and travels downwardly therefrom without radial step discontinuity to the proximity of bead 10a. The nature of sidewall portion 14a will be understood further from FIGS. 4a, 4b and 4c. As shown therein, surface 14b is also arcuately continuous with sidewall 14 along the radially interior perimeter of the sidewall with the thickness of portion 14a, i.e., the distance centrally between its surfaces 14b and 14c decreases with downward travel, ultimately to the nominal thickness of sidewall. This configuration of sidewall portion 14e eliminates well structure adjacent port 18 in the direction of pour both axially and perimetrically of the container sidewall and facilitates a lessening of content retention on container emptying efforts.

Referring to FIGS. 2 and 4, top closure 16 has a first land defining uppermost container surface 30. This surface is of U-shaped configuration as best shown in the plan view of FIG. 2, i.e., is a discontinuous annulus having opposed ends 30a and 30b. Radially outwardly of surface 30, closure 16 includes a grooved surface 32 bounded by perimeter rib 33. Base 12 has generally flat vertically recessed surface 12a and peripheral rimmed surface 12b spaced below 12a. In stacking a second identical container atop container 10, the counterpart surfaces 12a and 12b thereof cooperatively engage surfaces 30 and 32, respectively, with rib 33 restraining the stacked containers against lateral shifting.

A second land in top closure 16 defines a surface 34 vertically recessed from surface 30 and having port 18 formed therein in registry with the discontinuity in surface 30, i.e., intermediate annulus ends 30a and 30b. Surface 34 is recessed from surface 30 such that neck 28, when capped, may support handle 24 in its broken line FIG. 4 non-use position. A further land of top closure 16 may provide support for hub 20 and a surface 36 for seating handle 24 in its FIG. 4 solid line non-use position, the handle being recessed vertically of container uppermost surface 30 in both such non-use positions thereof.

Figure 5:
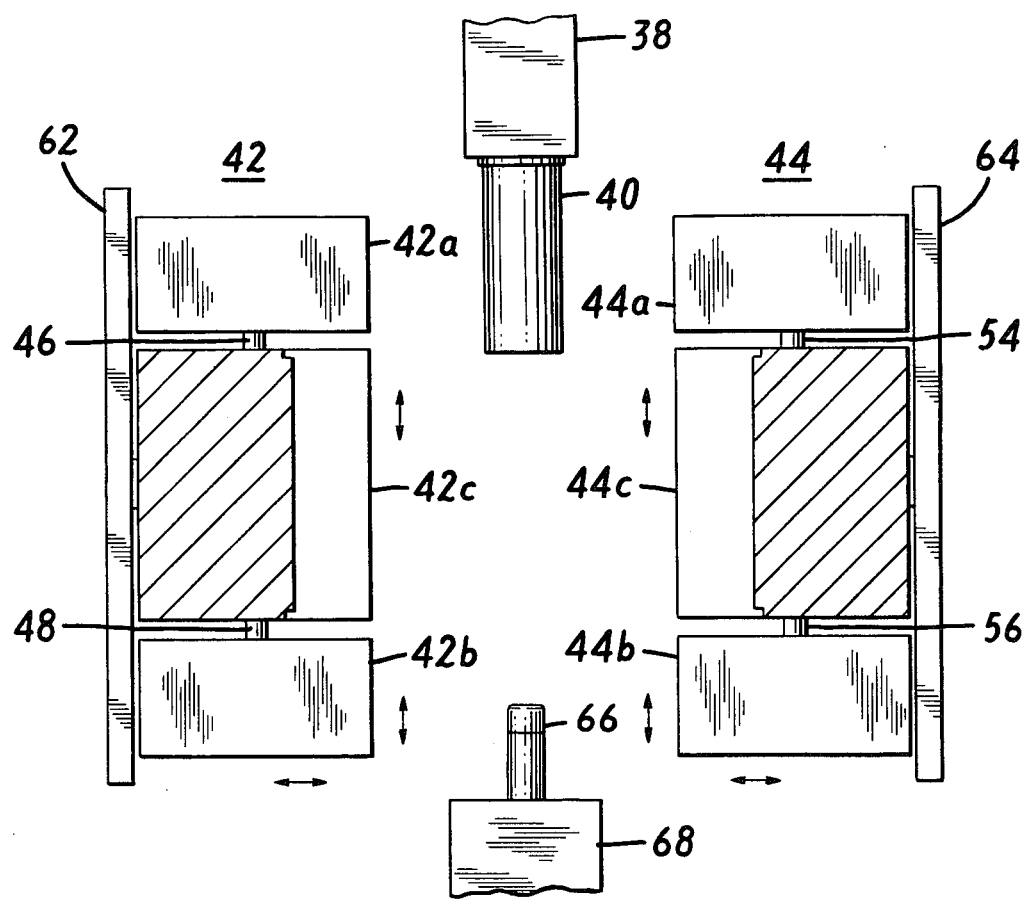
FIG. 5 is a front elevational view, partly in section, of apparatus for the manufacture of containers of the invention.
Figure 6:
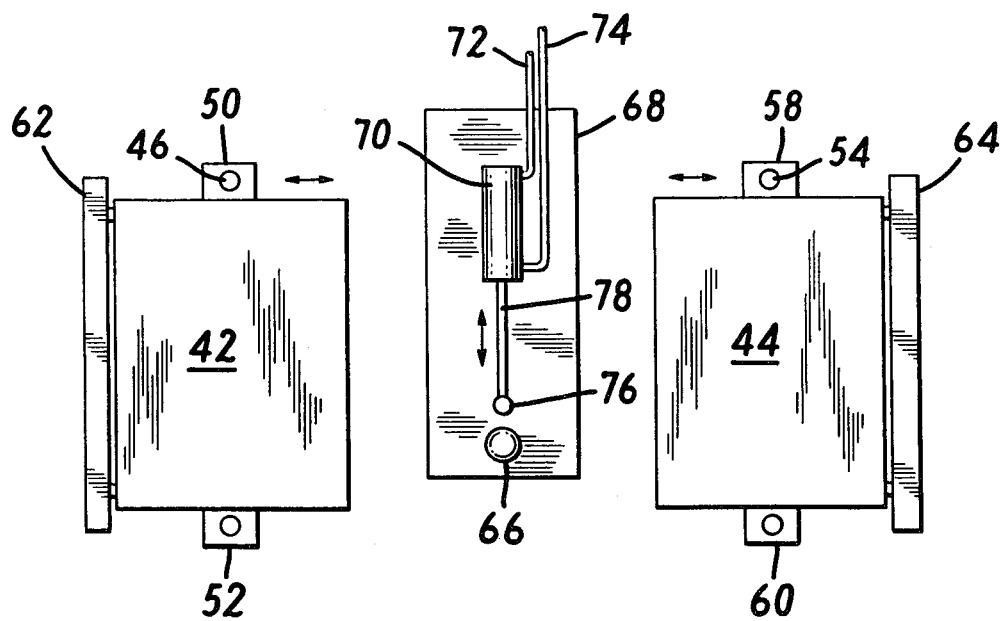
FIG. 6 is a plan view of the FIG. 5 apparatus.

Preferred apparatus for making the container of FIGS. 1-4 is shown in FIGS. 5 and 6. Extruder 38 issues extruded tube or parison 40 of plastic into the spacing between opposed molding members 42 and 44. Molding member 42 includes stationary upper section 42a and lower and central sections 42b and 42c which are vertically movable by shafts 46 and 48, as operated by hydraulic cylinder actuators 50 and 52. In such vertical movement, central section 42c engages stationary section 42a and lower section 42b engages central section 42c. Molding member 44 has counterpart sections 44a, 44b and 44c, shafts 54 and 56 and actuators 58 and 60. Members 42 and 44 are translatable horizontally on application of ram pressure to backing plates 62 and 64 by operating elements not shown, whereby members 42 and 44 may define a mold cavity in communication with blow pin 66. The blow pin is connected through its supporting base 68 with suitable source of pressurized air.

Figure 7:
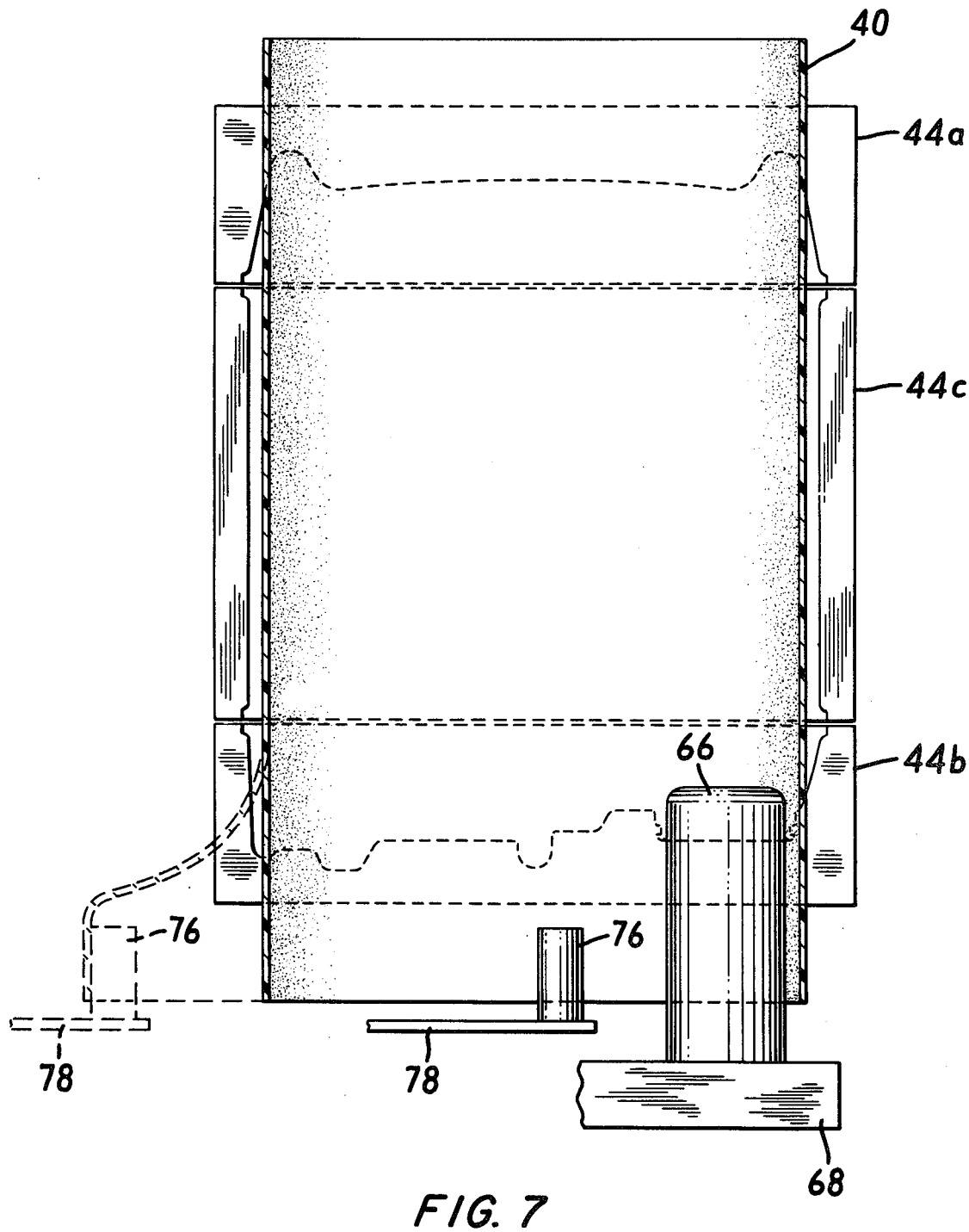
FIG. 7 illustrates the positional relationship of a parison and parts of the apparatus of FIGS. 5 and 6 preceding and following parison stretching in accordance with the invention.

Base 68 further supports auctator 70 furnished with pressurized air over lines 72 and 74 for translation of parison spreader or stretcher element 76, which is secured to actuator shaft 78. As is shown in FIG. 7, spreader element 76, in the form of a pin, is supported downwardly of molding member section 44b so as to be translatable without interfering with closure of molding members 42 and 44 along an axis perpendicular to the axis of movement of the molding members. In its rest position shown in solid lines in FIG. 7, spreader element 76 is adjacent blow pin 66.

With molding members 42 and 44 separated as in FIGS. 5 and 6, and with spreader element 76 in such rest position, parison 40 is fed to such vertical length and diameter as to envelop both blow pin 66 and spreader element 76 in its rest position, as shown in FIG. 7. As molding members 42 and 44 are moved toward one another, actuator 70 is operated to displace spreader element 76 leftwardly in FIG. 7 into its broken line position. In the course of such movement, the spreader element engages parison 40 and carries it leftwardly against the restraint imposed on the parison by blow pin 66. The parison is accordingly stretched over that portion thereof (FIG. 7) which will define top closure 16 and, more particularly, sidewall portion 14a, during subsequent blow molding of the container.

The discussed practice of selectively stretching the parison is found to avoid build-up of plastic in sidewall 14 in the vicinity of the perimetrically disposed filling-/emptying opening. Such build-up of plastic promotes formation of well structure and otherwise mitigates against attaining the abovenoted desired continuously arcuate, radially unstepped configuration of surface 14b of sidewall portion 14a.

By way of example, where the parison is made by extrusion of high density polyethylene to a wall thickness of 180 to 200 mils, with parison diameter being approximately 7 inches, stretching is practiced such that the spacing between blow pin 66 and spreader element 76 (in its leftward FIG. 7 position) is 10.5 inches.

After parison stretching and blow molding, molding members 42 and 44 are separated and the formed container is removed from blow pin 66. After removal of flash, a passage is punched in hub 20 for insertion of pin 22 and joinder thereto of handle 24 to complete the container. Spreader element 76 is preferably returned to its rest position during the blow molding operation and is desirably of lesser diameter than blow pin 66 to facilitate removal of the formed container and preparation for the next container manufacturing cycle.

Various changes and modifications may evidently be introduced in the foregoing preferred arrangements in practicing the invention. Thus, parison stretching may be accomplished by elements other than those particularly disclosed. The particularly described container embodiment, practice and apparatus for making are thus intended in an illustrative and not in a limiting sense. The true spirit and scope of the invention is defined in the following claims.

What is claimed is:

1. A method for making a plastic container having a port adjacent the container periphery comprising the steps of:
  (a) feeding a tubular parison into stationary position between opposed mutually spaced movable molding members and about a port forming blow pin positioned in the path of movement of said molding members at a location which will be adjacent a container sidewall forming portion of said molding members when said members are in a closed position;
  (b) while maintaining said blow pin fixedly positioned and in restraining relation to a first surface of said parison which will utimately define a portion of said port, selectively engaging a second surface of said parison, said second surface being located outwardly of the path of movement of said molding members and diametrically opposite said first surface and displacing said second surface, thereby stretching said parison unidirectionally transversely of the direction of such feeding thereof against such blow pin restraint on said first surface so as to stretch that portion of said parison which will define said container sidewall in the vicinity of said port and thereby avoid buildup of plastic in said portion; then (c) moving said molding members into engagement with such stretch parison; and (d) introducing pressurized air interiorly of said stretched parison to conform said stretched parison to said molding members.

2. The method claimed in claim 1 wherein said parison is elongate and is stretched over a preselected longitudinal expanse thereof.

3. The method claimed in claim 1 wherein said step (b) is practiced by engaging an interior surface of said parison.

* * * * *

UNITED STATES PATENT AND TRADEMARK OFFICE
CERTIFICATE OF CORRECTION

PATENT NO. : 4,092,392

DATED : May 30, 1978

INVENTOR(S) : George H. Dunbeker

It is certified that error appears in the above-identified patent and that said Letters Patent are hereby corrected as shown below:

At Col. 2, line 42, "integrally structured" should read --being integrally structured--.

At Col. 3, line 3, "portion 14e" should read --portion 14a--.

At Col. 3, line 52, "auctator 70" should read --actuator 70--.

At Col. 4, line 14, "abovenoted" should read --above-noted--.

Signed and Sealed this

Ninth Day of January 1979

[SEAL]

Attest:

RUTH C. MASON
Attesting Officer

DONALD W. BANNER
Commissioner of Patents and Trademarks